(12) United States Patent
Andersson et al.

(10) Patent No.: US 12,459,588 B2
(45) Date of Patent: Nov. 4, 2025

(54) DOOR ADJUSTMENT TOOL (71) Applicants: Ningbo Geely Automobile Research & Development Co., Ltd., Ningbo (CN); Zhejiang Geely Holding Group Co., Ltd., Zhejiang (CN)

(72) Inventors: Kaj Andersson, Mellerud (SE); Fredrik Wallander, Pixbo (SE)

(73) Assignees: Ningbo Geely Automobile Research & Dev. Co., Ltd., Ningbo (CN); Zhejiang Geely Holding Group Co., Ltd., Zhejiang (CN)

( * ) Notice: Subject to any disclaimer, the term of this patent is extended or adjusted under 35 U.S.C. 154(b) by 0 days.

(21) Appl. No.: 18/737,969

(22) Filed: Jun. 8, 2024

(65) Prior Publication Data

US 2024/0326939 A1    Oct. 3, 2024

Related U.S. Application Data

(63) Continuation of application No. PCT/CN2022/139386, filed on Dec. 15, 2022.

(30) Foreign Application Priority Data

Jan. 4, 2022   (EP) ..................... 22150232

(51) Int. Cl.
*B62D 65/02* (2006.01)
*B60J 5/04* (2006.01)
*B62D 65/06* (2006.01)

(52) U.S. Cl.
CPC .......... *B62D 65/026* (2013.01); *B60J 5/0468* (2013.01); *B62D 65/06* (2013.01)

(58) Field of Classification Search
CPC ....... B62D 65/026; B62D 65/06; B60J 5/0468
See application file for complete search history.

(56) References Cited

U.S. PATENT DOCUMENTS 5,040,290 A * 8/1991 Usui ...................... B62D 65/06
                                                          29/771
5,826,306 A 10/1998 Faubert et al.
(Continued)

FOREIGN PATENT DOCUMENTS

DE   102021000445 A1   3/2021
EP       3554872 B1    4/2021
(Continued)

OTHER PUBLICATIONS

International Search Report from corresponding International Application No. PCT/CN2022/139386 mailed on Apr. 6, 2023, 5 pages.

*Primary Examiner* — Kyle A Cook
(74) *Attorney, Agent, or Firm* — Tucker Ellis LLP (57) ABSTRACT

A door adjustment tool for a door of a vehicle including a holding plate having a rotational axis, a guide pin having a centre axis, and a holding arrangement, wherein the holding plate is provided with a first and a second side and the guide pin is arranged on the holding plate first side with its centre axis aligned and eccentric to the rotational axis of the holding plate, and the holding arrangement is arranged on the second side of the holding plate and configured to releasably fixate the door adjustment tool against a vehicle body or a door to be adjust.

5 Claims, 6 Drawing Sheets

(56) References Cited

U.S. PATENT DOCUMENTS

| | | | |
|---|---|---|---|
| 2014/0189996 A1* | 7/2014 | Wilkens | B62D 65/026 |
| | | | 29/281.6 |
| 2014/0366394 A1* | 12/2014 | Han | G01B 5/25 |
| | | | 33/600 |
| 2017/0174279 A1* | 6/2017 | Mueller | B23Q 3/186 |
| 2019/0225290 A1* | 7/2019 | Perkins | B25J 11/005 |
| 2020/0101572 A1* | 4/2020 | Spanner | B23Q 3/005 |
| 2021/0155305 A1* | 5/2021 | Hall | B62D 65/026 |
| 2022/0119057 A1* | 4/2022 | Nakano | B62D 65/06 |

FOREIGN PATENT DOCUMENTS

| | | |
|---|---|---|
| JP | 2007030681 A | 2/2007 |
| JP | 2010269704 A | 12/2010 |
| JP | 2014104813 A | 6/2014 |
| WO | 2013145995 A1 | 10/2013 |
| WO | 2020204859 A1 | 10/2020 |

\* cited by examiner

DOOR ADJUSTMENT TOOL

RELATED APPLICATION DATA

This application is a continuation of International Patent Application No. PCT/CN2022/139386, filed Dec. 15, 2022, and claims the benefit of European Patent Application No. 22150232.1, filed Jan. 4, 2022, the disclosures of which are incorporated herein by reference in their entireties.

TECHNICAL FIELD

The present disclosure relates generally to the field of doors of a vehicle, such as a sliding door for a passenger car. The disclosure further relates to an adjustment tool for adjusting a door for a vehicle in a correct position, a vehicle door arrangement, and a method for adjusting a position of a door of a vehicle in relation to the vehicle body.

BACKGROUND

Normally, the position of vehicle doors needs to be adjusted after the door has been attached to the vehicle body. The door is adjusted in the horizontal, vertical, and rotational direction to align the outer periphery of the door to the door opening in the vehicle body.

A common adjustment mechanism uses an excentre arranged in the hinge and/or sliding mechanism of the door. By turning the excentre, the doors position in relation to the vehicle body is adjusted.

A normal proceeding to mount and adjust a door is to mount the door on the hinges/sliding mechanism and thereby tightening the screws/bolts fixating the door. Thereafter closing the door to view the doors position in the vehicle body. To adjust the position of the door, the door needs to be opened, the fixating bolts untightened, and the adjusting mechanism operated, and the fixating bolts tightened again. Thereafter must the procedure be repeated until the door has a correct position in the vehicle body. Hence there is a problem that the correct position only can be seen when the door is closed, and the adjustment only can be made when the vehicle door is opened. This leads to a time consuming and expensive procedure when adjusting the doors position in the vehicle body.

SUMMARY

An object of the present disclosure is to suggest a more efficient way to adjust a door of a vehicle in relation to the vehicle body.

A first aspect of this disclosure relates to a door adjustment tool, a second aspect relates to a vehicle door arrangement and thirds aspect relates to a method for adjusting a vehicle door.

The first aspect of this disclosure relates to a door adjustment tool for a door of a vehicle, wherein the door adjustment tool comprises:
 a holding plate having a rotational axis,
 a guide pin having a centre axis, and
 a holding arrangement, wherein
  the holding plate is provided with a first and a second side and the guide pin is arranged on the holding plate first side with its centre axis aligned and eccentric to the rotational axis of the holding plate, and the holding arrangement is arranged on the second side of the holding plate and configured to releasably fixate the door adjustment tool against a vehicle body or a door to be adjusted.

One exemplary effect of the disclosed door adjustment tool is that it enables adjustment of door while door is in a closed arrangement on the vehicle. In one exemplary embodiment the holding plate is provided with a circle segment shaped surface at its out radius.

The door adjustment tool is adapted to be applied at an interface between a door and a vehicle body. The interface comprises a holding plate opening, which is adapted to receive the holding plate. The holding plate opening can thereby also be provided with a corresponding circle segment shaped surface, i.e., a support section, as the holding plate. The door adjustment tool can thereby be turned in the holding plate opening, simultaneously as the holding plate carries the weight of the door, when the doors fixating bolts/screws have been tightened.

In one exemplary embodiment the circle segment shaped surface is formed by a plurality of circle segments.

The plurality of circle segments forms the outline of a circle, whereby the holding plate can be turned a full 360 degrees and still support the door. Additionally, in a door with a matching holding plate opening for receiving the holding plate, the tool will be aligned by the matching circular holding plate and holding plate opening. The holding plate and the holding plate opening will thereby form a plain bearing in which the door adjustment tool can be turned.

In one exemplary embodiment of the door adjustment tool the holding plate is a circular cylindric.

In one exemplary embodiment of the door adjustment tool, the holding arrangement comprises at least one magnet at a radius outside the outer radius of the holding plate.

One exemplary effect providing at least one magnet about the holding plate, is that the magnet can releasably attach that door adjustment tool to the door in a fast and easy manner be, without the need for any additional fixating means.

In one exemplary embodiment of the door adjustment tool, the holding arrangement comprises a joint that can be turned or rotated. A rotating displacement of the holding plate can thereby be realized in relation to where the holding arrangement is fixated on the vehicle door or body, without moving the magnets. The rotatable joint can be a plain bearing, a sliding bearing, a ball, or roller bearing or the like. One exemplary effect thereof is that the attachment points between holding arrangement and the vehicle door/body, does not have to be displaced relative the vehicle side of the vehicle door arrangement, when the position of the door, by turning the door adjusting tool, is adjusted. A lower turning force will be needed and the risk for scratches between the holding arrangement and the vehicle door/body will be reduced or even eliminated.

In one exemplary embodiment of the door adjustment tool, the magnets of the holding arrangement are provided with a soft surface of a textile material and/or polymer material, at the side adapted to be pressed against the vehicle door or body. One exemplary effect thereof is that minimizes the risk of scratches at the vehicle door or body, at the contact points, and/or reducing the force needed to turn the door adjustment tool.

The at least one magnet can be distributed among a plurality of magnets provided at the same or different distance from the rotational axis of the holding plate. If one magnet is provided, it can be circular shaped and provided about the holding plate.

In one exemplary door adjustment tool a handle is connected to second side of the holding plate, wherein a rotational axis of the handle is coaxial arranged with the rotational axis of the holding plate. The handle is preferably configured such that it gives a leverage to the rotational axis of the holding plate when a turning force is applied upon the handle.

One exemplary effect of the handle is that it gives an effective torque transfer to the holding plate and thereby an effective turning of the door adjustment tool, when arranged in a door of a vehicle.

The second aspect of this disclosure relates to a door arrangement for a vehicle comprising:
  a door and
  at least one interface, in which the doors position can be adjusted in relation to the vehicle, wherein
  the interface comprises a door side and vehicle side and fastening arrangement for fastening the door side to the vehicle side, wherein the door side comprises a holding plate opening and the vehicle side comprises an elongated opening, wherein the elongated opening is arranged at least partially within the holding plate opening when doors side is arranged to the vehicle side by the fastening arrangement and the holding plate opening and the elongated opening thereby is arranged to receive the holding plate and the guide pin of a door adjustment tool as disclosed herein.

One exemplary effect of the disclosed door arrangement is that it enables adjustment of door while the door is in closed arrangement on the vehicle.

In one exemplary embodiment of the door arrangement, the holding plate opening comprises a circular support section in at least the upwards direction of the door side, or the holding plate opening comprises a circular support section around its whole circumference.

One exemplary effect of the circular support section— whole or partial—is that a turning of the door adjustment tool and its holding plate arranged in the holding plate opening, does not affect the position of the holding plate in the support section. Instead, the position of the door in relation to the vehicle body is adjusted through the movement of the guide pin in elongated opening. When the holding plate, with a corresponding circular segment is arranged in the circular support section of the holding plate opening, a plain bearing is formed.

In one exemplary embodiment of the door arrangement, the interface is provided between the door and a door carriage, or between the door carriage and the vehicle body.

One exemplary effect of the second aspect of the disclosed door arrangement is the flexibility in its position, either between the door and a door carriage, e.g., hinge or between the door carriage and the vehicle.

In one exemplary embodiment of the door arrangement, the door arrangement comprises at least three interfaces positioned along an upper or lower edge of the door and the elongated opening of the middle interface is positioned in a vertical direction in relation to the door and the elongated openings of the outer interfaces are positioned in a horizontal direction in relation to the door.

One exemplary effect of the suggested alignment of the elongated openings is that the middle interface is adapted to position the door in a horizontal direction and the outer interfaces is adapted to position respective outer side in vertical direction, whereby an easy adjustment of the door position in all directions is provided. The interfaces can be arranged such in relation to each other that when the door adjustment tools are arranged in the door, i.e., with the holding plate in respective holding plate opening, the two outer door adjustment tools can carry the weight of the door and the middle door adjustment tool is unloaded.

In one exemplary embodiment of the door arrangement, the middle interface is provided with a wider holding plate opening. This gives the exemplary effect that the door adjustment tool, arranged in the middle interface, can be arranged without carrying any weight of the door, when all door adjustment tools are arranged in their respective interfaces and the fastening arrangement is untightened.

In one exemplary embodiment of the door arrangement, the fastening arrangement comprises bolts and/or screws. The bolts and screws facilitate an easy tightening and loosening of the fastening arrangement before and after adjustment of the doors position.

One exemplary embodiment comprises a vehicle comprising a door arrangement as disclosed herein. The door of the door arrangement can especially be a sliding vehicle door.

A third aspect of this disclosure relates to a method for adjusting a position of door in relation to the vehicle body, wherein the vehicle body comprises a door arrangement as disclosed herein, and the method comprises the method steps of:
  positioning at least one door adjustment tool as disclosed herein, in its position in the interface,
  loosening the fastening arrangement
  positioning the door by turning the door adjustment tool
  tightening the fastening arrangement
  removing the door adjustment tool.

The method facilitates a fast and exact adjustment of the door in relation to the vehicle body, without the need for opening and closing the door, when performing and reviewing the adjustment.

In one exemplary embodiment of the method, at least three door adjustment tools are positioned in the respective interfaces; and the method step of positioning the door by turning the door adjustment tool comprises at least one of:
  positioning the door in a horizontal direction by turning a first door adjustment tool,
  positioning one side of the door in a vertical direction by turning a second door adjustment tool and
  positioning another side of the door in a vertical direction by turning the third door adjustment tool.

BRIEF DESCRIPTION OF THE DRAWINGS

The invention is now described, by way of example, with reference to the accompanying drawings, in which the same reference notations denote equivalent items in the various figures, and in which.

DETAILED DESCRIPTION OF EXAMPLE EMBODIMENTS

The detailed description with reference to the disclosed embodiments is to be viewed as examples that combining specific features described above. It is to be understood that additional examples may be achieved by combining other and/or fewer/more features than in the disclosed embodiments. Hence, the figures disclose exemplary embodiments and not as exclusive combinations. In this context is should also be noted that, for the sake of simplicity, all figures are schematically disclosed, if nothing else is said.

Figure 1A:
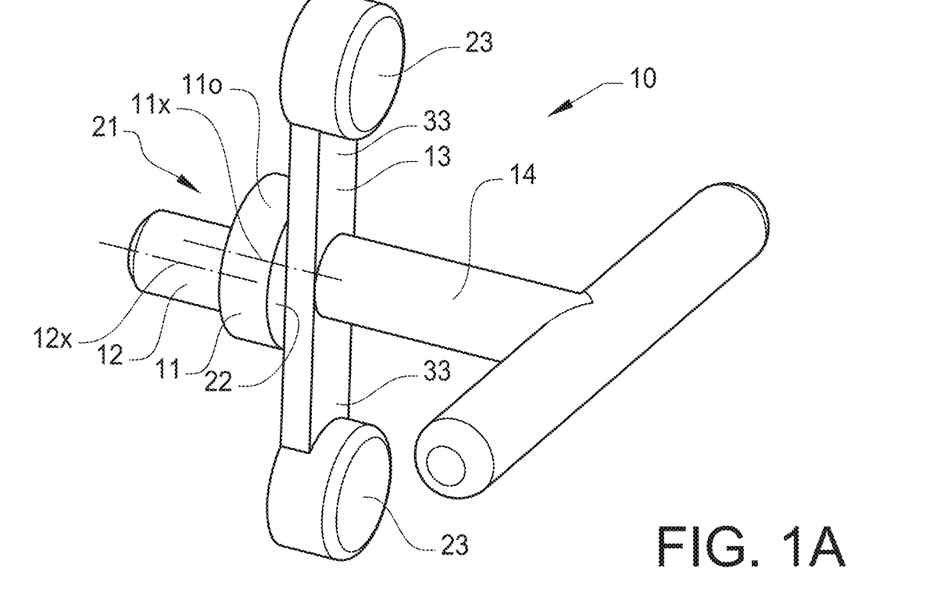
FIGS. 1A and 1B discloses an embodiment of a door adjustment tool.
Figure 1B:
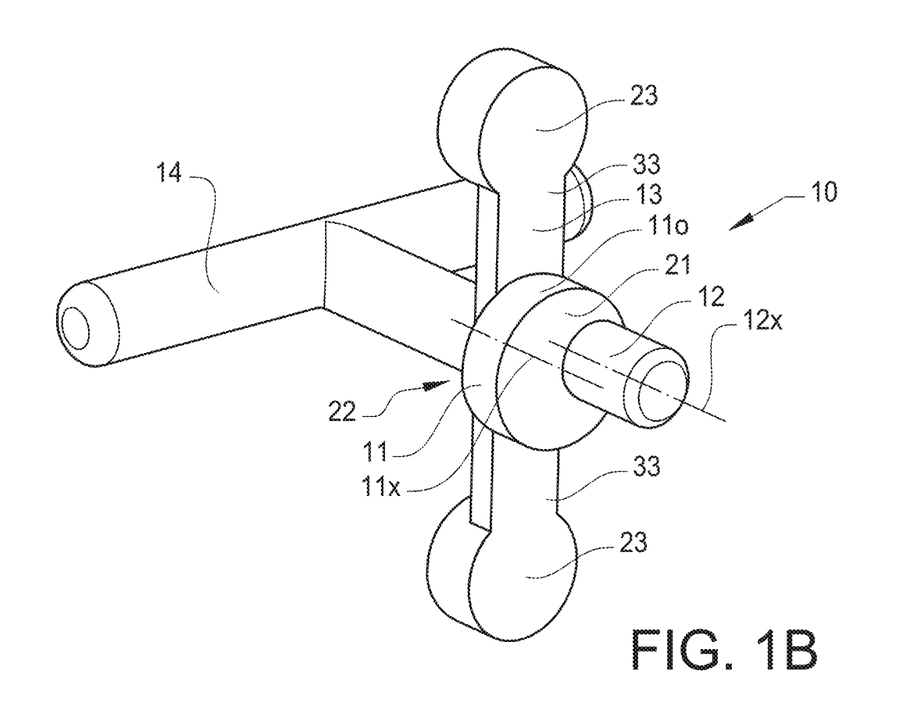

FIGS. 1A and 1B discloses an embodiment of a door adjustment tool 10 from two different views. The door adjustment tool 10 comprises a holding plate 11, with a rotational axis 11x, which also is the rotational axis of the door adjustment tool 10 as such. In the disclosed embodiment, the holding plate 11 if formed with a radial circular shaped surface (110) and thereby as a circular cylindric body, with a first 21 and a second 22 side surface.

A guide pin 12 is eccentrically arranged on the first side surface 21 of the holding plate 11, such that a rotational axis 12x of the guide pin 12, is aligned with and displaced to the rotational axis 11x of the holding plate 11. The guide pin 12 is formed as a circular cylindrical body.

The door adjustment tool of FIGS. 1A and 1B is further provided with a holding arrangement 13. The holding arrangement 13 is arranged upon the second surface 22 of the holding plate 11 and comprises two magnets 23, arranged on a respective arm 33 extending out from the second side surface 22 of the holding plate 11.

The holding arrangement 13 can be arranged rotational fixed to the holding plate 11 or be arranged in a rotatable joint, such that the holding plate 11 can rotate relative the holding arrangement 13. A rotatable arrangement can be facilitated by any known bearing type, such as a ball baring, roller bearing, or plain bearing. The holding arrangement 13 holds the door adjustment tool 10 in place, when the holding plate 11 is arranged in the holding plate opening 111.

In alternative embodiment fewer or more magnets 23 and respective arms 33 are provided. For example, a circular magnet 23 can be provided about the holding plate 11, or a configuration of a plurality of magnets 23 in a regular or irregular pattern can be provided about the holding plate 11.

Independent of the number of magnets 23, the magnets 23 are arranged such in relation to the holding plate 11, that the side with the first side surface 21 of the holding plate 11 extends out from a plane formed by the magnets 23. The magnets 23 can be arranged in alternative manners, dependent on their attachment surface on the door 51 to be adjusted.

Figure 2A:
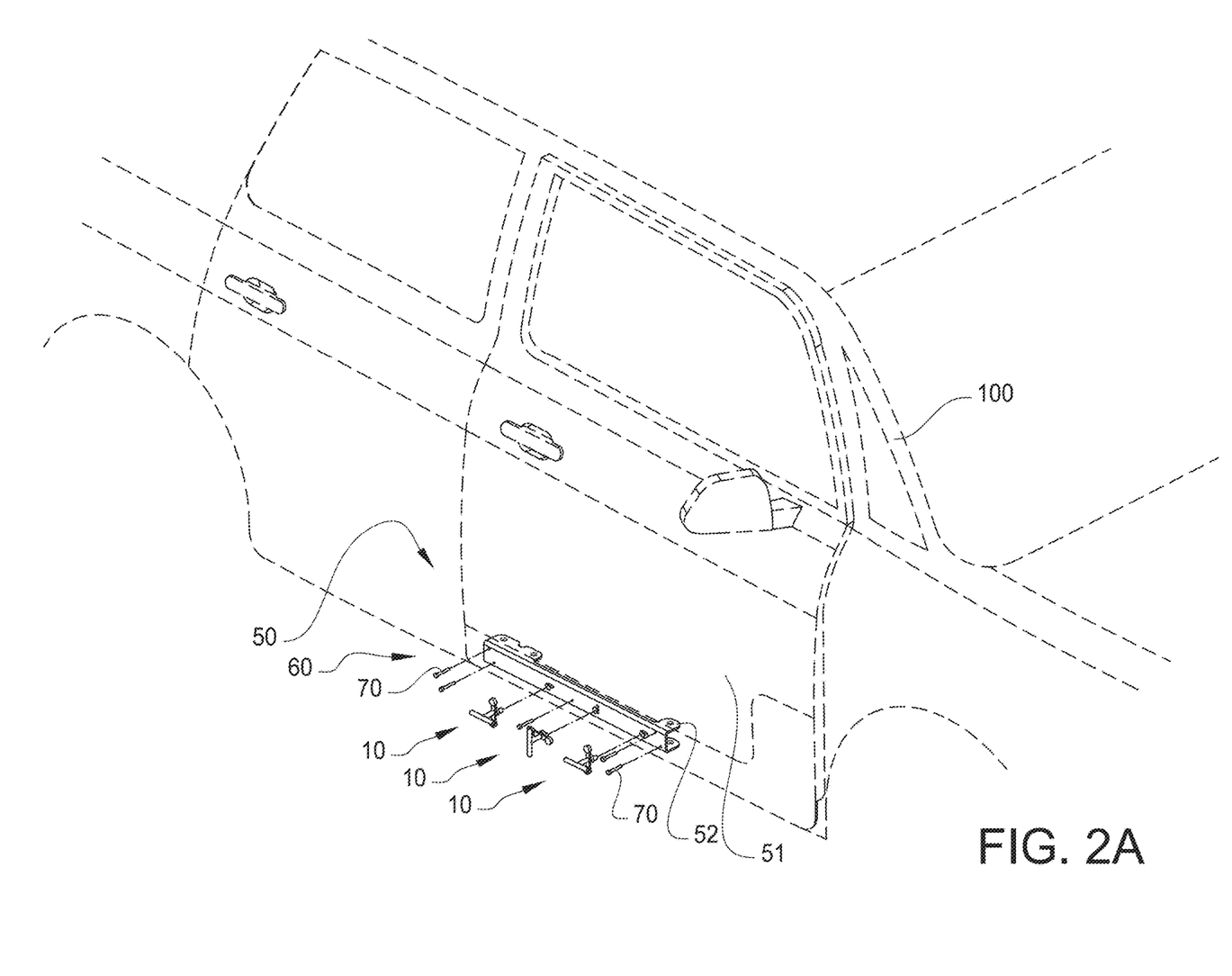
FIGS. 2A and 2B disclose an embodiment of a door arrangement and a door adjustment tool.

Now, in FIG. 2A an exemplary door arrangement 50 comprising an interface 60 is disclosed together with a door adjustment tool 10. The door 51 is a sliding door 10 and the door carriage/hinge 52 is adapted to carry the weight of the door 51. A more detailed view of the interface 60 is disclosed in FIG. 2B, where the interface 60 is shown in an exploded view. The door arrangement 50 comprises a door 51, a hinge 52 and fastening arrangement 70. The hinge 52 is adapted to be arranged on a vehicle, to position the door 51 in relation to the vehicle body 100 and provide for support of the door 51 and enable a sliding opening of the door 51. The hinge 52 is only partially and schematically disclosed, sufficiently to explain the function of the door adjustment tool 10 and door arrangement 50. The fastening arrangement 70, exemplified by bolts, fixates the door side D to the vehicle side V. When the door 51 has been arranged in the vehicle body 100, the position of the door 51 can be find tuned in relation to the vehicle body 100 when the door adjustment tool 10 interacts with the interface 60. This is further explained in conjunction with FIG. 4 below.

The interface 60 comprises a vehicle side V and a door side D. In FIG. 2A the vehicle side V and door side D is provided between the hinge 52 and the door 51. In the disclosed embodiment, the holding plate opening 111 is arranged on the door side D and the elongated opening 112 is arranged on the vehicle side V of the interface 60. In an alternative, not disclosed embodiment, the holding plate opening 111 can be arranged on the vehicle side V and the elongated opening 112 arranged on the door side D.

Figure 2B:
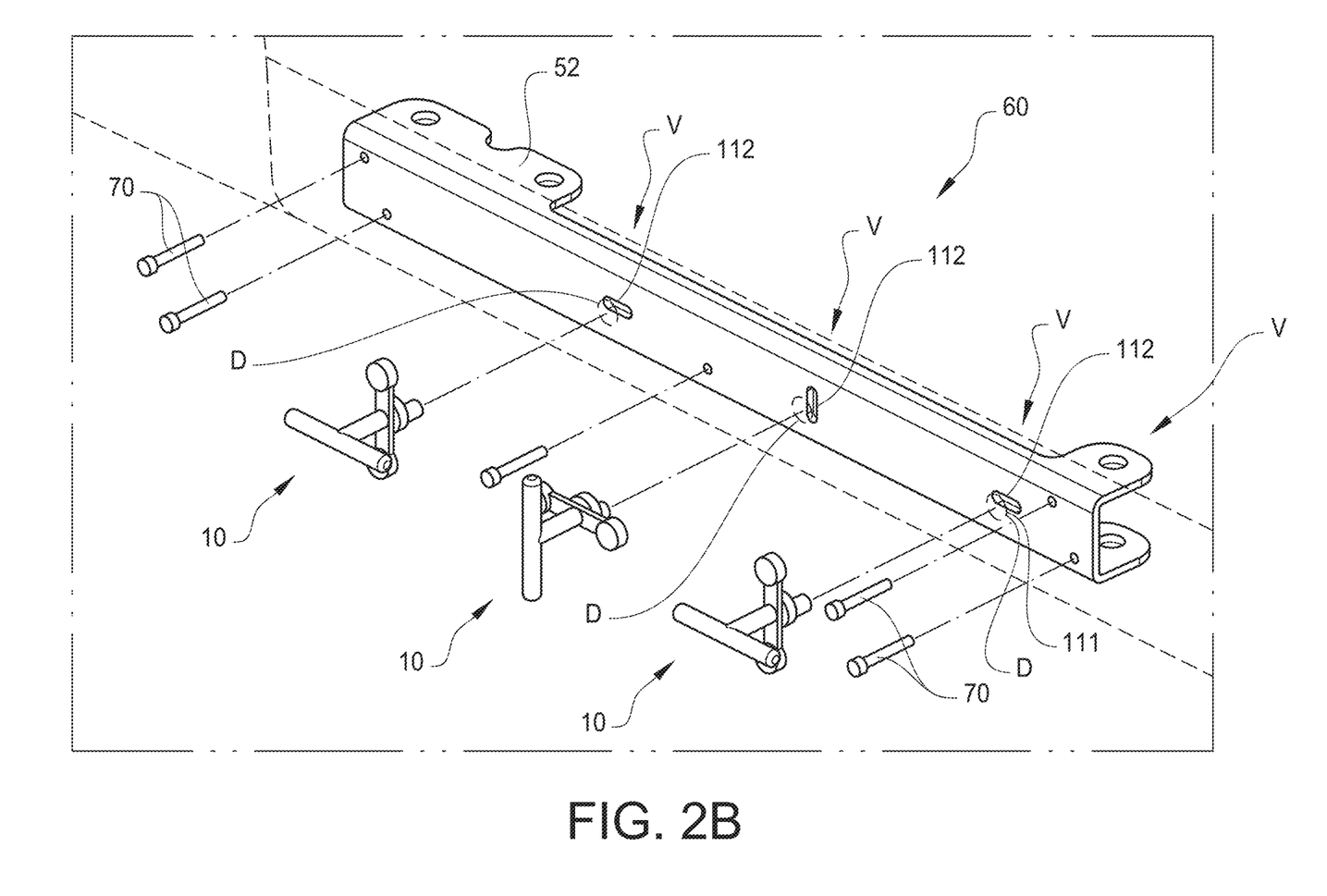

When the door 51 is arranged in the vehicle body 100, the elongated opening 112 is arranged such in relation to the holding plate opening 111, that it is at least partially overlaps with the holding plate opening 111. The holding plate 11 of the door adjustment tool 10, can thereby be arranged in the holding plate opening 111 simultaneously as the guide pin 12 is arranged in the elongated opening 112.

When arranged in the holding plate opening 111, the door adjustment tool 10 is hold in place by the holding arrangement 13, independent of, if the holding plate 11 carries the weight of the door 51 or not.

To adjust the door 51 the holding plate 11 of the door adjustment tool 10 is inserted into the holding plate opening 111. A turning of the door adjustment tool 10, will cause a rotation of the holding plate 11, whereby the guide pin 12 will be pressed at one of the long sides of the elongated opening 112. When the door's fastening arrangement has been loosened, the doors position in relation to the vehicle body 100 will be adjusted.

Figure 3A:
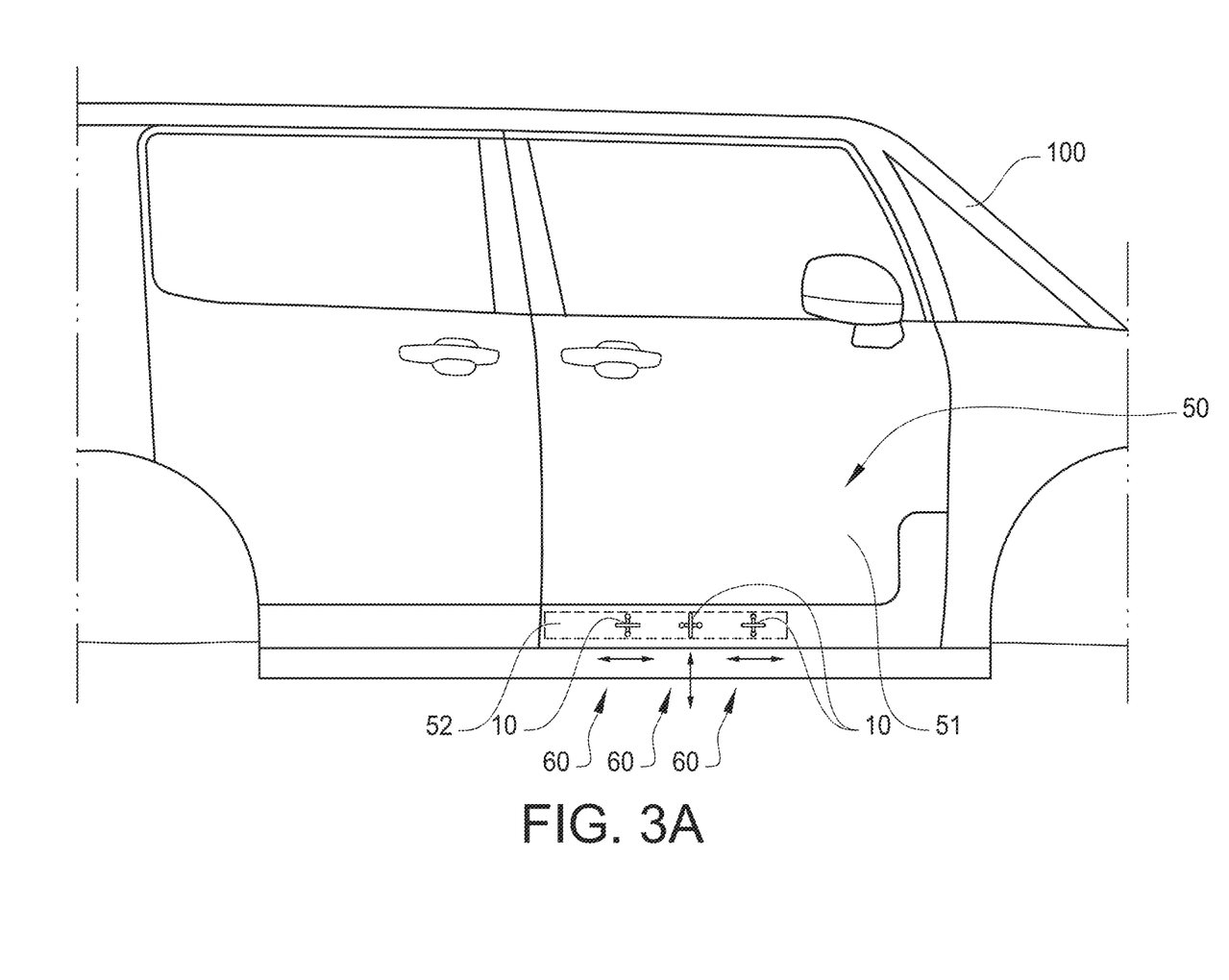
FIGS. 3A and 3B disclose two alternative embodiments of a door arrangement in a vehicle.
Figure 3B:
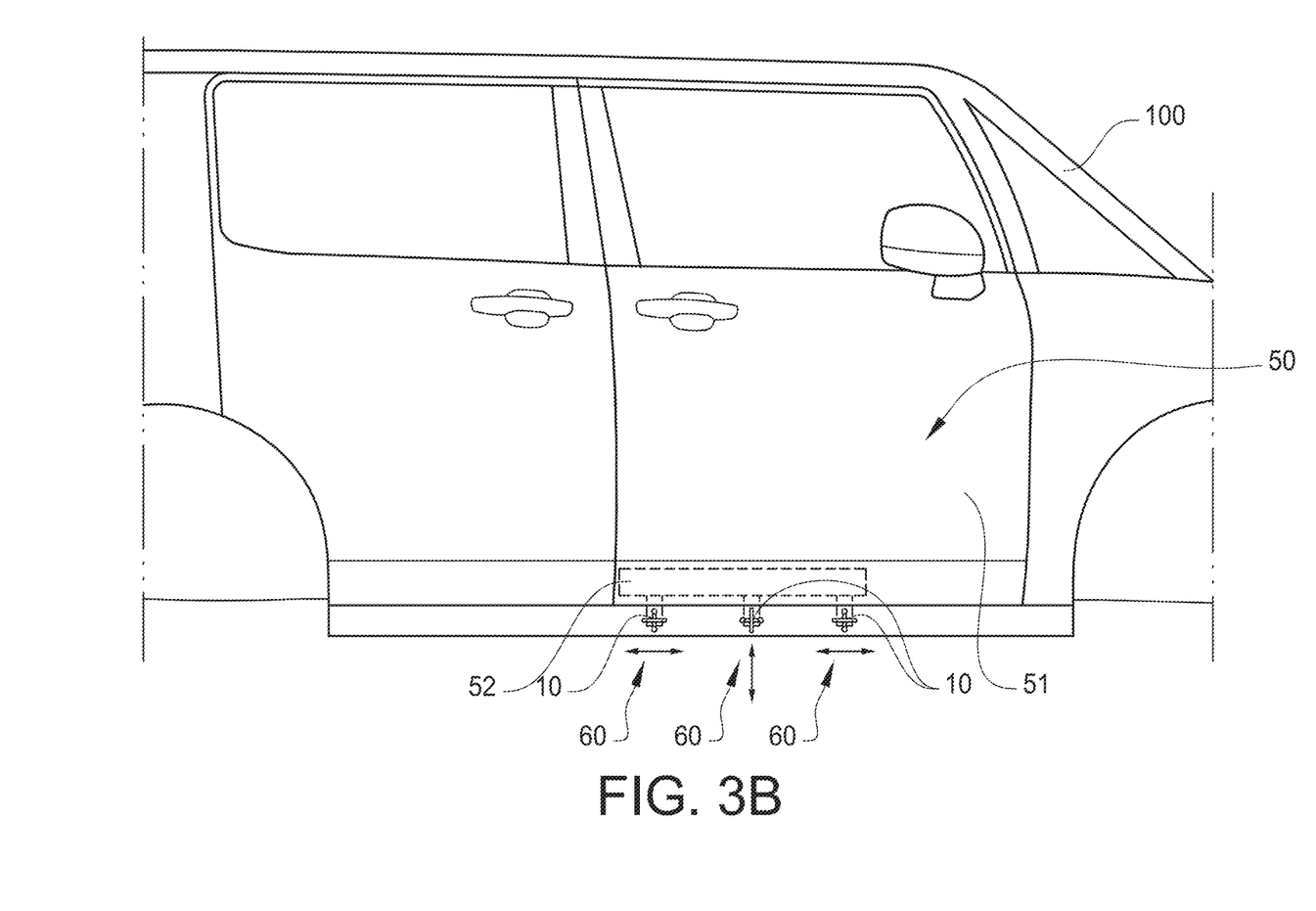

FIG. 3A and FIG. 3B, different allocations of the interface and thereby the door side D and vehicle side D. In FIG. 3A, the door side comprises the door 51 but not the hinge 52, whereby the interface between the door side D and vehicle side V is between the door 51 and the hinge 52. Hence, the interface 60 is provided between the door 51 and a door carriage/hinge 52.

In FIG. 3B the door side D comprises both the door 51 and the hinge 52, whereby the interface between the door side D and the vehicle side V is between the hinge 52 and the vehicle body 100. Hence, the interface 60 is provided between the door carriage/hinge 52 and the vehicle body 100. In alternative, not disclosed, embodiments the interface 60 can be provided between different parts of the hinge 52 and/or different locations of the door 51, i.e., upper edge, a side edge or in the middle, dependent where the door carriage/hinge 52 is arranged.

The door arrangement disclosed in FIGS. 2A, 2B and 3A, 3B comprises three adjustment positions, i.e., interfaces 60, each provided with a holding plate opening 111 and an elongated opening 112 and all provided at the bottom of the door. Alternative embodiments might comprise a different number of adjustment positions arranged at different interface locations between the door side D and vehicle side V.

Figure 4:
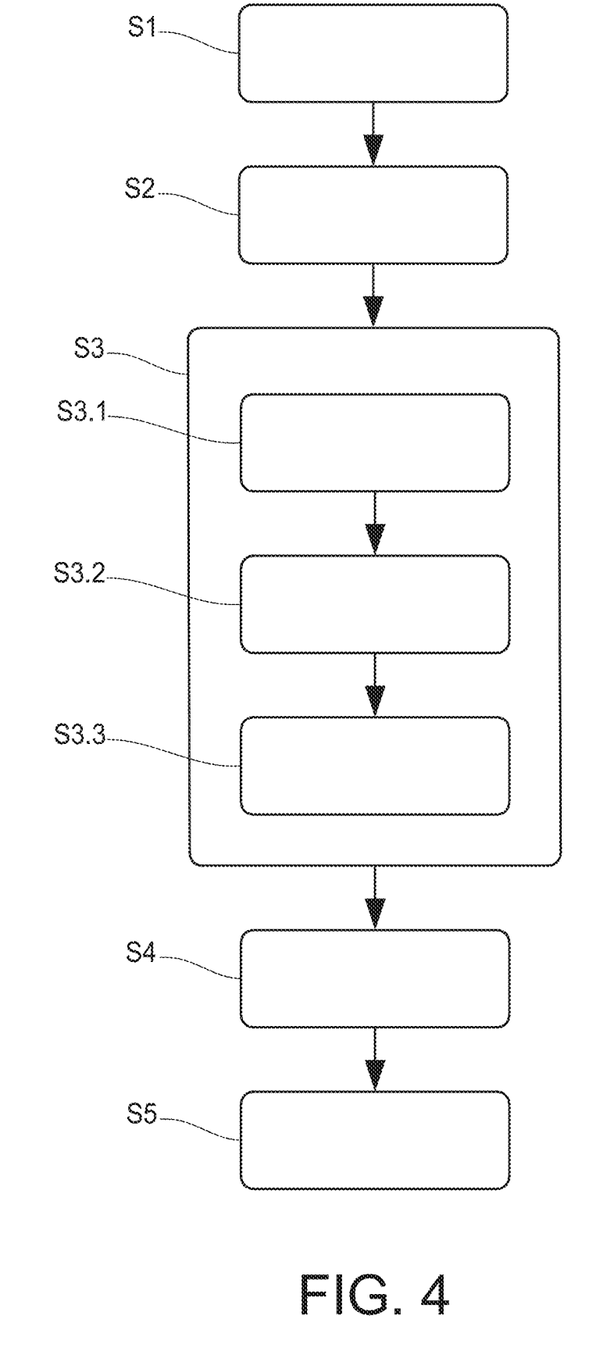
FIG. 4 discloses a flow chart of an exemplary adjustment process.

FIG. 4 discloses a schematic flow chart of the disclosed method.

A first step comprises: positioning S1 at least one door adjustment tool 10 in its position in a respective interface 60.

In this step the holding plate 11 of the door adjustment tool 10 is arranged in the holding plate opening 111 of the interface 60.

A second step comprises: loosening S2 the fastening arrangement 70.

When the fastening arrangement 70 is loosened, the weight of the door 51 will be carried by the holding plate 11 of the adjustment tool 10, arranged in the holding plate opening 111.

A third step comprises: positioning S3 the door 51 by turning the door adjustment tool 10.

When the door adjustment tool 10 is turned, e.g., by turning the handle 14, the holding plate 11 is turned in the holding plate opening 111, whereby the guide pin 11 is rotated about the rotational axis 11x of the holding plate 11. The guide pint 12, thereby acts on the elongated opening 112 and the position of the door 51 is adjusted.

A fourth step comprise: tightening S4 the fastening arrangement 10.

When the door 51 is adjusted such that, it is aligned with a door opening in the vehicle body 100, the fastening arrangement 70 is tightened again, such that the fastening arrangement 70 secures the door side D to the vehicle side V and the door thereby is securely attached to the vehicle body 100.

A fifth step comprise: removing S5 the door adjustment tool 10.

When the door 51 is securely attached to the vehicle body 100, the door adjustment tool 10 can be removed again and used for adjusting another door 51.

In an embodiment of the disclosed method, the method step of "positioning S3 the door 51 by turning the door adjustment tool 10" one or several sub steps can be applied.

Especially for a door adjustment arrangement 50 as disclosed in FIGS. 2A, 2B, 3A and 3B comprising three interfaces 60, and the door adjustment tool 10 is positioned in its respective interface 60. The two outer interfaces 60 are arranged to adjust the door 51 in the vertical direction, whereby the elongated opening 112 is arranged in a horizontal direction. The middle interface 60 is arranged to adjust the door 51 in a horizontal direction, whereby the elongated opening 112 is arranged in a vertical direction.

A first sub step comprises: positioning S3.1 the door 51 in a horizontal direction by turning a first door adjustment tool 10.

A second sub step comprises: positioning S3.2 one side of the door in a vertical direction by turning a second door adjustment tool 10.

And a third sub step comprises: positioning S3.3 another side of the door 51 in a vertical direction by turning a third door adjustment tool 10.

The first, second and third sub steps can be made in any desired order and any of the sub steps can be repeated, until the door 51 is sufficiently adjusted towards the vehicle body 100.

Although the door adjustment tool 10 and door arrangement 50 has been illustrated and described in detail in the drawings and foregoing description, such illustration and description are to be considered illustrative or exemplary and the invention is not limited to the disclosed embodiments.

What is claimed is:

1. A door adjustment tool for a door of a vehicle, wherein the door adjustment tool comprises:
    a holding plate having a rotational axis,
    a guide pin having a centre axis, and
    a holding arrangement, wherein
    the holding plate is provided with a first and a second side and the guide pin is arranged on the holding plate first side with its centre axis eccentric to the rotational axis of the holding plate, and the holding arrangement is arranged on the second side of the holding plate and configured to releasably fixate the door adjustment tool against a vehicle body or a door to be adjusted.

2. The door adjustment tool according to claim 1, wherein the holding arrangement comprises at least one magnet at a radius outside an outer radius of the holding plate.

3. The door adjustment tool according to claim 1, wherein a handle is connected to the second side of the holding plate, wherein a rotational axis of the handle is coaxially arranged with the rotational axis of the holding plate.

4. The door adjustment tool according to claim 1, wherein the holding plate is provided with a circle segment shaped surface at its outer radius.

5. The door adjustment tool according to claim 4, wherein the circle segment shaped surface is formed by a plurality of circle segments or is formed as a circle.

* * * * *